April 16, 1929.  D. W. GILL ET AL  1,708,969
TOY VEHICLE WHEEL AND METHOD OF ASSEMBLING SAME
Filed March 16, 1926
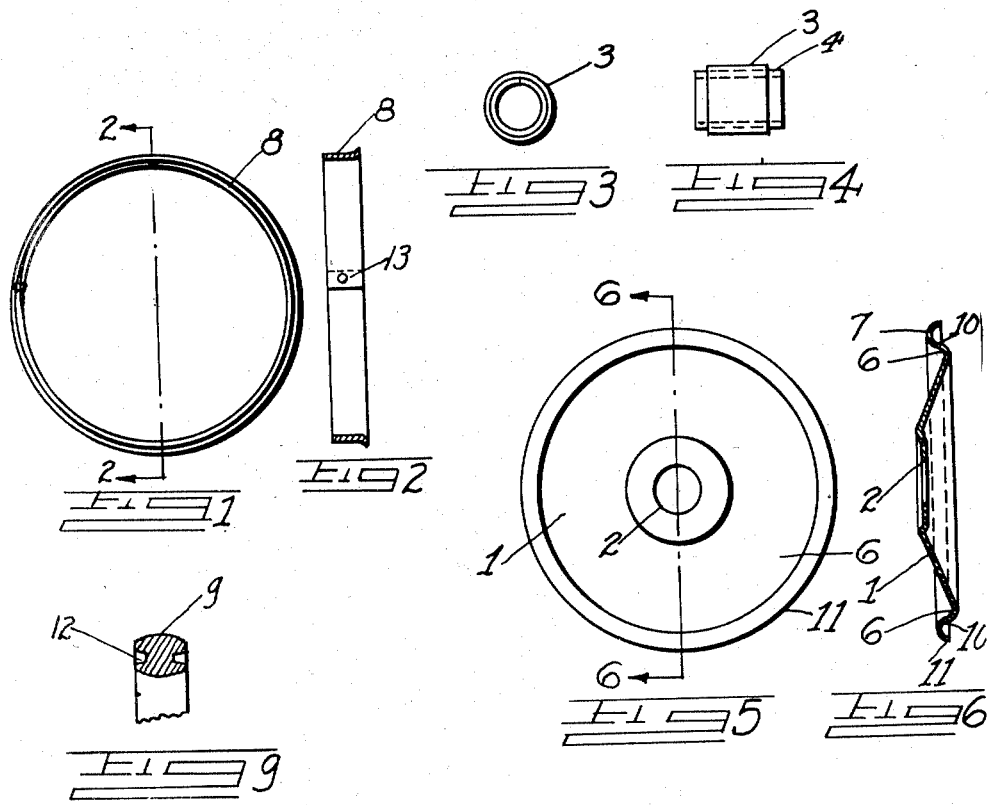
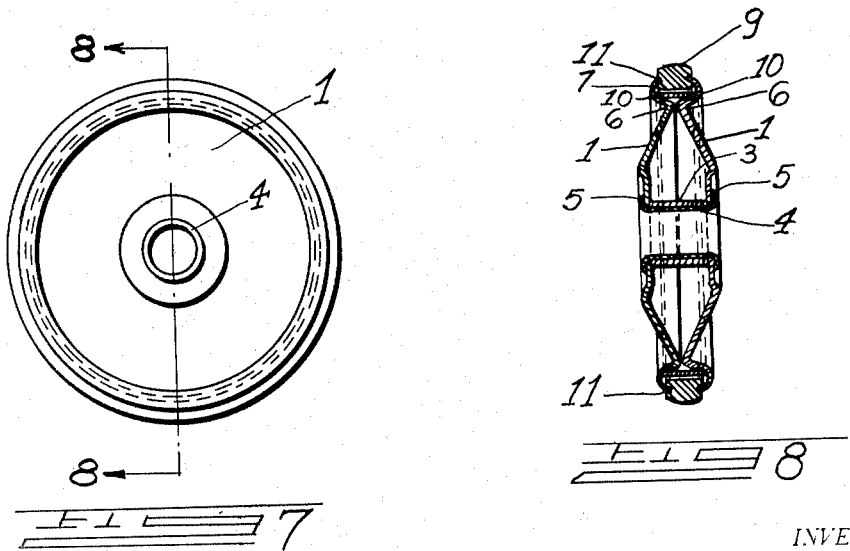
INVENTOR.
Donald W Gill
BY Mark P Orr
Allen & Allen
ATTORNEY.

Patented Apr. 16, 1929.

1,708,969

UNITED STATES PATENT OFFICE.

DONALD W. GILL AND MARK P. ORR, OF NORWOOD, OHIO, ASSIGNORS TO THE FRANK F. TAYLOR COMPANY, OF NORWOOD, OHIO, A CORPORATION OF OHIO.

TOY VEHICLE WHEEL AND METHOD OF ASSEMBLING SAME.

Application filed March 16, 1926. Serial No. 95,161.

Our invention relates to the general class of toy vehicle wheels and particularly wheels which are adapted to support rubber tires or tires of similar material.

It is the object of our invention to provide a wheel carrying a tire, which may be readily assembled without the necessity of spot welding.

In the art for providing rolling supports for toy vehicles such as wagons, kiddie cars, baby walkers, trucks and many other types of vehicles, it has been customary to provide wheels which are formed of pairs of circular discs having aligned axial orifices which are adapted to seat bushings which are flanged over the outer walls of the discs to secure the discs together. It has been customary to provide a spacing sleeve within the discs disposed on the outside of the bushing. The discs have been stamped with concentric depressed and raised annular indentations ending in the outer peripheries in annular inturned flanges which engage annular grooves in the side walls of a resilient tire. The means of securing the discs together have been provided both by the flanged bushings and by spot welding adjacent portions of the depressed grooves of the discs together. The expense of spot welding has been great and since the tires are assembled on the wheel before the spot welding can take place, wheels made in this manner have required hand painting in order to avoid spoiling the appearance of the tires.

It is the object of our invention to construct in addition to the discs for a wheel, a rim element which will be adapted to frictionally engage the outwardly curving inner wall of concentrically aligned indentations on each of the discs in order to eliminate the necessity of spot welding. Thus the discs are locked during the assembling of the tires on the wheels so that there is no additional operation necessary either to install the tire or to insert the rim, the entire operation being completed in one pressing operation.

It is my object to construct disc elements which may be painted by the cheaper spraying method, and by means of the rim element which may be frictionally locked together by a close driving fit over the entire shoulder circumference of the discs, on the shoulder formed by the bottom of the inturned flanges when locked together. This is the final step in the assembling, prior to the crimping over of the axial bushings.

There has been some development in the manufacture of rims which act as spacing plates and in which rings have been provided which engage the outwardly flaring shoulders adjacent the peripheries of two co-operating discs but the use of such devices require an additional manufacturing step and the devices are not applicable to discs which have inturned flanges which seat in grooves in the side walls of resilient tires. It is to such a type of wheel that our invention particularly relates.

Referring to the drawings in which we have illustrated a preferred embodiment of our invention.

Figure 1 is a side elevation of a preferred type of rim element.

Figure 2 is a sectional view along the lines 2—2 in Figure 1.

Figure 3 is an end elevation of the usual bushing and spacing sleeve.

Figure 4 is a side elevation of the bushing and spacing sleeve assembly.

Figure 5 is a side elevation of one of the discs which form a wheel.

Figure 6 is a sectional view along the lines 6—6 of Figure 5.

Figure 7 is a side elevation of my novel wheel assembly including the discs, rims, tire and bushing and spacing sleeve.

Figure 8 is a sectional view along the lines 8—8 in Figure 7.

Figure 9 is a cross section of the tire.

Generally indicated at 1 I have illustrated one of the disc portions which is combined with a complementary portion of the same shape which, as will be noted from a reference to Figure 8, is disposed in the assembly in opposing position. One disc forms the outer side of the wheel and the other the inner side. The disc portion 1 is usually provided with a central orifice 2, by means of which the wheel is mounted on the axle of the toy vehicle. As shown in Figures 3, 4, 7 and 8 the usual mounting and securing means which holds the two discs together at their centers is the spacing sleeve 3 and the bushing 4 which is extended through the orifices in each disc and crimped over as indicated at 5 in Figure 8. The discs preferably have concentric annular indentations 6, which in former practice were secured together by spot welding, and at their outer peripheries they are provided with inturned annular flanges 7. The essence of our invention consists in the provision of a rim 8 which may be engaged during the operation of securing the tire 9, which rim is of such size that it frictionally engages the outwardly flaring inner peripheral walls 10 of the indentations 6. Thus the necessity of spot welding the two complementary rim portions together as has been customary in the past, is avoided. Further, the rim is locked in place during the operation of engaging the grooves 12 of the tire by the pair of complementary inturned flanges 11. The rim illustrated is formed from a strip of metal bent into an annular shape with the overlapping ends secured with a rivet 13 to form a rigid unitary structure. For some types of vehicles it will be preferable to provide a rim having a bisecting slot so that both a spring and frictional interlocking may be provided. The discs may be painted by spraying and then assembled by placing the rim portion within one of the inturned flanges and pressing the other flange into position at the same time engaging the tire in position on the wheel. As shown in Figure 8 the outer edges of the inturned flanges as shown at 11 are utilized to support the tire 9, and our invention does not contemplate the use of a tire which is installed after the wheel is formed. The last step in assembling the wheel is in accordance with the usual practice, the crimping over of the outer edges of bushing 4 so as to engage the walls of the discs adjacent the central orifices.

Modifications of our invention in which other types of securing means are utilized to frictionally engage the walls of complementary disc elements near their outer edges we consider within the scope of our invention.

Having thus described our invention, what we claim as new and desire to secure by Letters Patent, is:—

1. In combination, a resiliently tired wheel comprising a tire and a wheel, said wheel composed of complementary discs having central orifices, aligned annular indentations, and peripherally inturned flanges for retaining said tire, means for securing said discs together adjacent their central orifices, and means for frictionally securing said discs together adjacent the aligned annular indentations.

2. In combination, a resiliently tired wheel comprising a tire and a wheel, said wheel composed of complementary discs having central orifices aligned annular indentations, and peripherally inturned flanges for retaining said tire, means for securing said discs together adjacent their central orifices, and means for frictionally securing said discs together adjacent the aligned annular indentations, said frictionally securing means comprising a band adapted to frictionally engage outwardly flaring inner walls of said annular indentations.

3. That method of assembling a resiliently tired wheel which consists in providing a tire and a pair of discs having axle retaining means, aligned annular indentations and peripheral tire securing annular flanges, and providing a rim member of suitable size to frictionally engage walls of said annular indentations and assembling a tire on said discs by inserting said rim member within said annular indentations and pressing the discs together frictionally locking said rim member within said annular indentations and engaging said tire with said peripheral tire securing means simultaneously.

4. That method of assembling a resiliently tired wheel which consists in providing a tire and a pair of discs having axle retaining means, aligned annular indentations and peripheral tire securing annular flanges, and providing a rim member of suitable size to frictionally engage walls of said annular indentations and assembling a tire on said discs by inserting said rim member within said annular indentations and pressing the discs together thereby frictionally locking said rim member within said annular indentations and engaging said tire with said peripheral tire securing flanges simultaneously, and then securing said discs together adjacent their axle retaining means.

5. In a wheel having a tire, a pair of discs having means securing same together adjacent their centers, each disc having concentric reversely curving peripheral flanges, the outer edges of said flanges curving inwardly and adapted to retain a tire, and the outwardly flaring portions of said reversely curved flanges having surfaces forming shoulders, and a metallic band for frictionally engaging said shoulders.

DONALD W. GILL.
MARK P. ORR.